United States Patent [19]
Litt

[11] Patent Number: 5,815,651
[45] Date of Patent: Sep. 29, 1998

[54] METHOD AND APPARATUS FOR CPU FAILURE RECOVERY IN SYMMETRIC MULTI-PROCESSING SYSTEMS

[75] Inventor: Timothe Litt, Southboro, Mass.

[73] Assignee: Digital Equipment Corporation, Maynard, Mass.

[21] Appl. No.: 711,386

[22] Filed: Sep. 6, 1996

Related U.S. Application Data

[63] Continuation of Ser. No. 415,218, Mar. 28, 1995, abandoned, which is a continuation of Ser. No. 264,803, Jun. 23, 1994, abandoned, which is a continuation of Ser. No. 778,030, Oct. 17, 1991, abandoned.

[51] Int. Cl.$^6$ ............................... G06F 11/00; G06F 9/00
[52] U.S. Cl. ................................ 395/182.08; 395/182.18; 395/677
[58] Field of Search ...................... 371/11.3, 11.1, 371/8.1, 9.1; 364/231.4, 231.5, 229.4, 229.5, 228.1, 943.9, 943.91, 944.3, 228.2, 230, 230.2, 230.3, 230.5; 395/515, 182.08, 182.11, 183.07, 182.09, 182.13, 183.2, 670, 672, 677, 182.18

[56] References Cited

U.S. PATENT DOCUMENTS

| | | | |
|---|---|---|---|
| 3,959,638 | 5/1976 | Blum et al. | 395/182.09 |
| 4,200,226 | 4/1980 | Piras | 395/185.08 |
| 4,562,538 | 12/1985 | Berenbaum et al. | 395/182.13 |
| 4,628,508 | 12/1986 | Sager et al. | 395/182.11 |
| 4,751,702 | 6/1988 | Beier et al. | 395/182.11 |
| 4,775,976 | 10/1988 | Yokoyama | 395/182.02 |
| 4,823,256 | 4/1989 | Bishop et al. | 395/182.08 |
| 4,894,828 | 1/1990 | Novy et al. | 395/182.09 |
| 5,214,652 | 5/1993 | Sutton | 395/182.08 |
| 5,235,700 | 8/1993 | Alaiwan et al. | 395/182.11 |

*Primary Examiner*—Trinh L. Tu
*Attorney, Agent, or Firm*—David A. Dagg

[57] ABSTRACT

Method and apparatus for operating a multiprocessor data processing system (10) of the symmetric multiprocessor (SMP) type so as to continue the execution of a process running on a failed CPU (CPU-F). In response to a failure of one of the CPUs a first method performs the steps of: detecting that one of the CPUs has failed during the execution of a first process; extracting an internal processing state from the CPU-F; inserting the extracted processing state into a second, recovery CPU (CPU-R); and completing the execution of the first process with the CPU-R. During the time that the CPU-R executes the first process the CPU-R assumes the identity of the CPU-F, and furthermore assumes the ownership of any spinlocks that may have been owned by CPU-F. If selected from an active set of CPUs the operation of the CPU-R may be timeshared between the first process and a process that is running in the CPU-R. Timesharing involves periodically unloading one processing state and loading another into CPU-R; the loading and unloading of states being accomplished by a service processor unit (SPU 12) over a serial scan bus or a parallel diagnostic bus. Loading and unloading may also be accomplished in a high speed manner through a microcode-assisted process run by CPU-R.

23 Claims, 3 Drawing Sheets

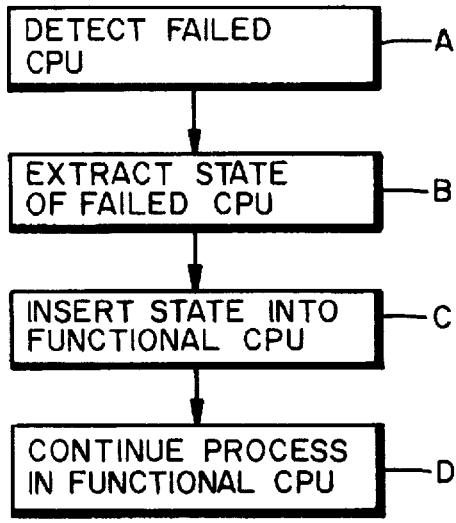
FIG. 2
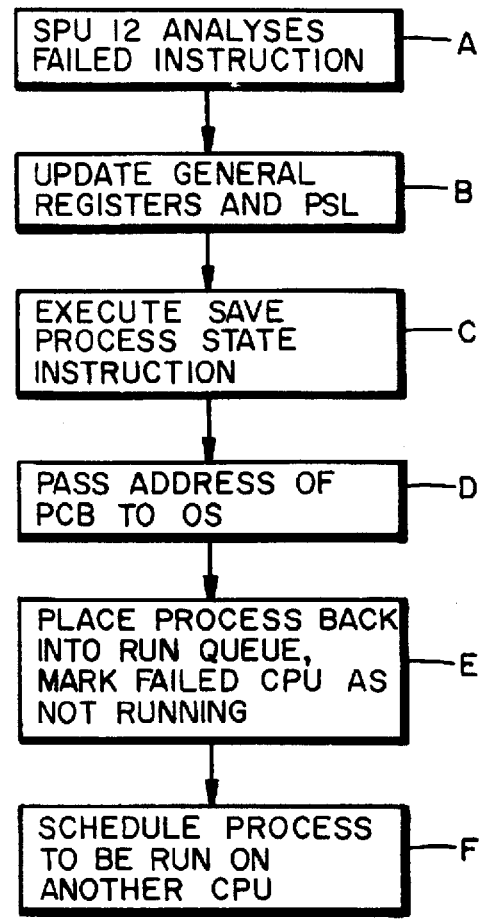
FIG. 5
CPU-FAILING EXCEPTION STACK FRAME
| IDENTIFIER OF CPU-F (LONGWORD INTEGER) |
|---|
| PC OF CODE RUNNING WHEN EXCEPTION INITIATED |
| PSL OF CODE RUNNING WHEN EXCEPTION INITIATED |
FIG. 4

METHOD AND APPARATUS FOR CPU FAILURE RECOVERY IN SYMMETRIC MULTI-PROCESSING SYSTEMS

This application is a continuation of application Ser. No. 08/415,218, filed Mar. 28, 1995, now abandoned, which is a continuation of application Ser. No. 08/264,803, filed Jun. 23, 1994, now abandoned, which is a continuation of application Ser. No. 07/778,030, filed Oct. 17, 1991, now abandoned.

FIELD OF THE INVENTION

This invention relates generally to digital data processing method and apparatus and, in particular, to method and apparatus for accomplishing an error recovery in a symmetric multi-processor (SMP) data processing system.

BACKGROUND OF THE INVENTION

Conventional wisdom holds that a failure in one CPU of a SMP data processing system generally results in a "crash" of all other CPUs. One obvious cause is the interdependences resulting from resources that are shared between the CPUs. Both hardware and software approaches have been implemented to prevent tightly coupled SMP systems from failing due to a failure of a constituent CPU.

Hardware solutions generally involve reducing a probability of a hardware failure through either increased fault tolerance or by employing loosely coupled systems. However, these hardware approaches generally circumvent the underlying problem and typically consider error recovery to be a software issue.

Attempts to deal with the problem through software have been somewhat successful, although the success is probabilistic and not reliable.

For example, CPUs which fail may simply be ignored in the hope that the error will be self-correcting. However, this approach typically results in systems which deadlock. That is, the approach results in a condition where a non-failing CPU requires a resource that is owned by the failing CPU, but that cannot be relinquished due to the failure. This condition is referred to in the art as a deadlock. Typically, a resource is locked, or acquired by a first CPU, through an atomic instruction of the test-and-set type. This instruction tests a control variable, a read/write location, and, if the location is not already set, sets the location. Thus, a flag associated with a shared resource is set to indicate that the resource is in use by the first CPU. A second CPU, seeking to acquire the resource, also executes the test-and-set instruction. However, in that the flag is already set, the test fails. A tight loop is typically entered wherein the second CPU "spins" on the "locked" resource, hence the name "spinlock", until the resource is released by the first CPU, the flag is reset, and the second CPU's test-and-set instruction succeeds. As can be realized, if the first CPU fails before releasing the resource, the second CPU will not exit from the spinlock loop.

Another approach requires that a working CPU identify all software resource locks that are owned by the failed CPU in an attempt to release these resources.

This approach may achieve a temporary result of preventing the system from deadlocking. However, downstream effects may become apparent long after the CPU failure. Data corruption is one possible result. Operating systems that rely on this approach assume that some system consistency check will eventually fail. At best, this is a probabilistic strategy, but may represent the most effective of the conventional software techniques for dealing with a CPU failure.

Another conventional approach attempts to partition the system such that any damage resulting from a failed CPU is localized. This results in the failure of at least one executing process, while others remain unaffected.

However, none of these conventional approaches to preventing failure of a tightly coupled SMP system attempt to recover the failed process, nor do they deal effectively with shared resources owned by a failing CPU.

Theoretically, if one could provide enough state information to the operating system, the operating system could reschedule the failing instruction stream on a remaining CPU, and continue operation. In reality, however, this is an extremely complex process for the software to accomplish. For example, the operational CPUs may be waiting for spinlocks that are owned by the failed CPU, and the failed CPU may have been waiting for spinlocks owned by one of the remaining CPUs.

This software complexity could be avoided if the failed CPU could be kept running long enough to complete all existing code threads and perform an orderly shutdown. However, in that the underlying hardware has (by definition) failed, conventional practice has dismissed this approach as being unrealistic.

It is thus one object of the invention to provide method and apparatus to recover a failed process and to deal effectively with shared resources in a SMP data processing system.

It is another object of the invention to provide method and apparatus for use in a SMP data processing system for collecting state information from a failed CPU, or other redundant component, and for providing the state information to a functioning CPU for continuing, at least temporarily, the execution of the affected process in the functional CPU.

SUMMARY OF THE INVENTION

The foregoing and other problems are overcome and the objects of the invention are realized by a method and apparatus for operating a multiprocessor data processing system so as to continue the execution of a process running on a failed data processor. In response to a failure of one of the data processors the method performs the following steps. A first step detects that one of the data processors has failed during the execution of a first process. A second step extracts an internal processing state from the failed data processor. A third step inserts or loads the extracted internal processing state into a second, functional data processor. A fourth step completes the execution of the first process with the second data processor, referred to as a recovery data processor. During the time that the second data processor executes the first process the second data processor assumes the identity of the failed data processor, and furthermore assumes the ownership of any spinlocks that may have been owned by the failed data processor prior to the failure. The second data processor may be selected from an inactive set of processors or may be selected from an active set. If selected from the active set the operation of the second data processor may be timeshared between the process associated with the first data processor and a process that is running in the selected data processor. Timesharing involves periodically unloading one processing state and loading another into the second data processor. This loading and unloading may be accomplished by a service processor over a serial scan bus or a parallel diagnostic bus. Loading and unloading may also be accomplished in a high speed manner through a microcode-assisted process run by the second data processor. In accordance with a preferred embodiment of the invention, a portion of a shared system memory is reserved for storing the states of the failed data processor and the recovery data processor. Also, a register is defined for storing flag bits that indicate whether any of the data processors of the system are undergoing recovery. An operating system exception is also defined for informing the operating system of the identity of the failed data processor so that the failed data processor can be permanently assigned to the set of inactive data processors.

In accordance with a second embodiment of the invention there is provided a method of operating a symmetric multiprocessing system in response to a failure of one of the data processors. This method includes the steps of (a) detecting that a first one of the data processors has failed during the execution of an instruction of a process; (b) analyzing the failed instruction to determine if data was corrupted by the failure; and if it is determined that data was not corrupted, (c) saving the process context of the failed data processor within a process controlled block. The method further includes the step of (d) passing the address of the process control block to an operating system executing on a second one of the data processors. The address is passed with an indication that the first data processor has failed. In response to the reception of the address of the process control block the method includes the further steps of (e) placing the process into a run queue; (f) assigning the first data processor to a set of permanently inactive data processors; and (g) scheduling the process for execution upon another data processing means.

BRIEF DESCRIPTION OF THE DRAWING

The above set forth and other features of the invention are made more apparent in the ensuing Detailed Description of the Invention when read in conjunction with the attached Drawing, wherein:

FIG. 2 is a flow chart illustrating a first method of the invention;

FIG. 4 shows the organization of a stack that is one aspect of the invention; and FIG. 5 is a flow chart illustrating a second method of the invention.

DETAILED DESCRIPTION OF THE INVENTION

Figure 1:
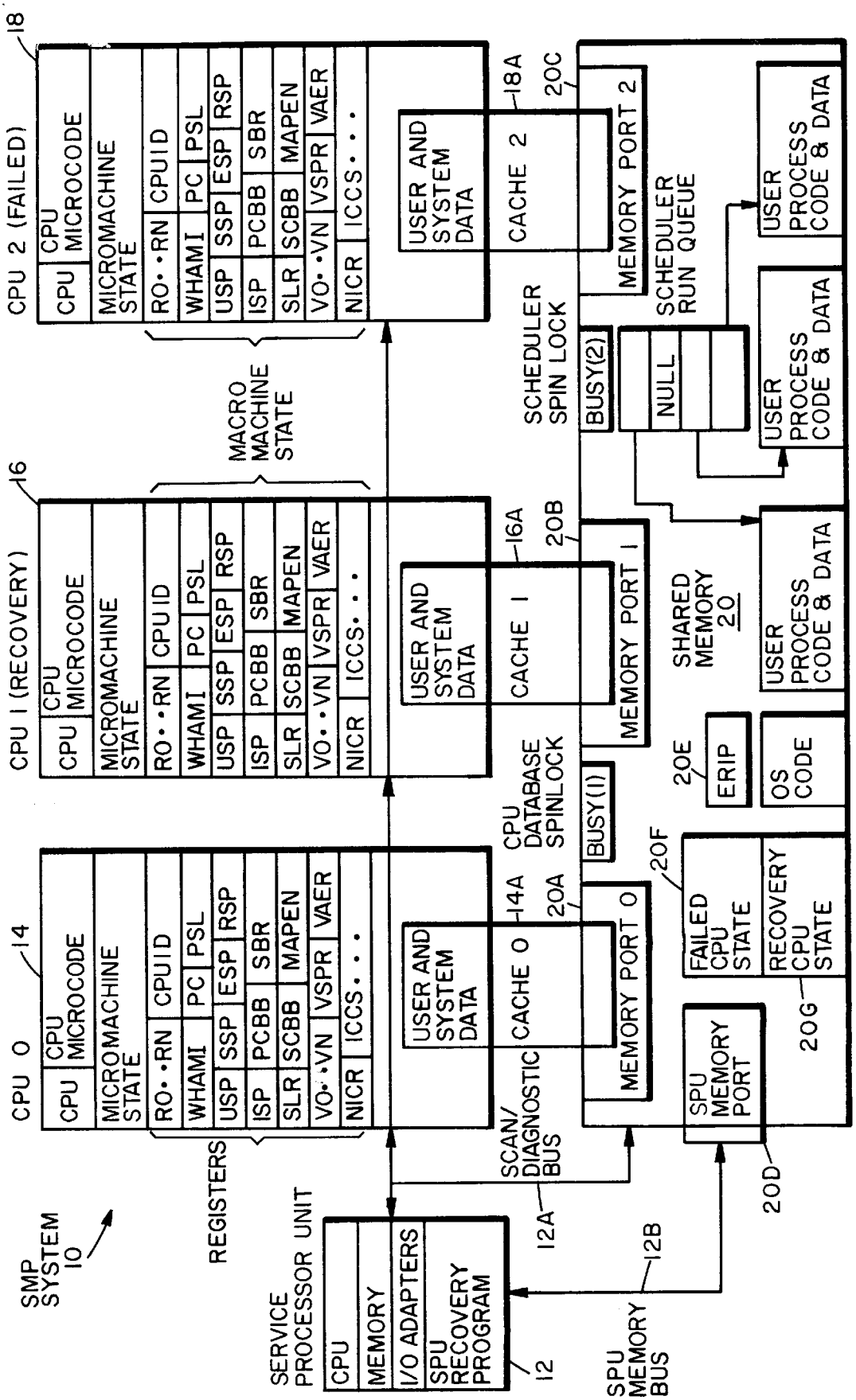
FIG. 1 is a block diagram of a SMP system that is constructed and operated in accordance with the invention.

Referring to FIG. 1 there is illustrated a SMP system 10 constructed and operated in accordance with the invention.

It is first noted that all program code examples given below are in the VAX (VAX is a registered trademark of the Digital Equipment Corporation) format and, although the invention is described in the context of a system operated in accordance with the VAX family of data processors, it should further be noted that the teaching of the invention applies to SMP systems in general. That is, the teaching of the invention is not intended to be limited to any one particular hardware or software embodiment, system architecture, or family of data processing devices.

As employed herein a SMP data processing system, or SMP system, is considered to include at least two central processing units (CPUs) that are coupled together through a shared memory for executing, in a coordinated fashion, user and operating system (OS) processes. The CPUs may be separate data processing systems connected by wiring to a shared memory unit, or may each be embodied within one or more highly integrated circuit chips that are coupled to a shared memory. Conceptually, a SMP system contains one copy of the operating system, although as a practical matter some components may be physically replicated for improved performance or reliability.

SMP 10 includes a service processor unit (SPU) 12 that is coupled to a plurality of CPUs (CPU0 14, CPU1 16 and CPU2 18) via a SCAN/DIAGNOSTIC Bus (SDB) 12a. Each of the CPUs is bidirectionally coupled by an associated high speed cache memory (CACHE0 14a, CACHE1 16a, CACHE2 18a, respectively) to a shared memory 20.

Although three CPUs are illustrated it should be realized that the system may include from two to some arbitrarily large number of CPUs.

In regard to the SCAN/DIAGNOSTIC Bus 12a, this bus may be a well known type of four wire serial bus that is threaded through the various registers and memory locations in each of the CPUs in order to permit the contents of the internal registers and memories to be serially shifted in or out. Alternatively, the SDB 12a may be embodied as a parallel data path for reading and writing the internal registers and memory locations of the CPUs 14–18.

In greater detail, the SPU 12 includes a local CPU, local working memory, I/O adapters, and a memory region for storing a SPU-executed recovery program, the operation of which is described in detail below. The SPU 12 is coupled, via a SPU memory bus 12b and a SPU memory port 20d, to the shared memory 20. Each of the cache memories 14a–18a is also coupled to the memory 20 through an associated memory port, specifically, Memory Port0 20a, Memory Port1 20b, and Memory Port2 20c, respectively.

Each of the CPUs 14–18 includes a local CPU, a storage for CPU microcode, a micromachine state stored within registers and random access memory (RAM), and a plurality of registers. A detailed description of these registers is provided below.

For the illustrated embodiment the shared memory 20 can also be seen to include a region that stores OS code executed by the CPUs 14–18. A Scheduler Run Queue is also memory resident and includes pointers, represented by arrows, for indicating the location in the memory 20 of user process code and data segments, each of which is typically associated with one of the CPUs 14–18. As can be seen, one of the Scheduler Run Queue entries may correspond to a null process that does not explicitly reference a region in memory 20. Associated with the Scheduler Run Queue is a Scheduler spinlock that can be seen to be busy and owned by the CPU2 18, as indicated by the expression BUSY(2). A CPU data base spinlock is owned by the CPU1 16. Other spinlocks, not shown, may also exist at any given time in the memory 20.

To facilitate the description of the invention the CPU2 18 is designated as a "failed" CPU while the CPU1 16 is designated as a "recovery" CPU. CPU0 14 could also function as the recovery CPU if so desired. A failed CPU is considered to be a CPU that becomes non-operational during the operation of the system 10. The recovery CPU is considered to be CPU that, in accordance with the invention, assumes the identity and functionality of the failed CPU in order to accomplish an orderly termination of the failed CPU functions, including the release of all shared resources that are owned by the failed CPU at the time of failure. This aspect of the invention, controlled by the SPU 12 recovery program, is now described in detail.

Terminology employed herein is first defined.

i-stream—Instruction stream.

PA—Physical Address.

IPL—In the VAX architecture, the highest Interrupt Priority Level which will not be accepted by the CPU.

IPR—Internal processor register. In the VAX architecture, a shared register or memory location accessible only to privileged operating system code.

REI—In the VAX architecture, the instruction which lowers IPL and causes an exit from privileged mode.

SPU—Service Processor Unit. An agent having access to CPU state by serial scan or other means, such as parallel diagnostic busses. In a scan-based design, the SPU is enabled to determine the exact nature of errors, to roll back the i-stream (and modified data) to a continuable state, and to save and modify all processor state information. If an error is recoverable, a macro-machine need see only the loss of time caused by the error isolation and recovery process. If an error is not recoverable, it is still possible for the SPU to extract a continuable state from the failed CPU.

SVPTE—In the VAX architecture, a page table entry which maps a system address.

WHAMI—A read-only VAX IPR which uniquely identifies the executing CPU to the OS.

TODR—In the VAX architecture, the time-of-day IPR.

ELEA—An optional Error Log Entry Available interrupt. A service routine for this interrupt may read TODR to detect and correct for time loss.

SBR, SLR, SPTEP—Memory management registers that control Virtual Memory (VM) translations.

SCBB—Interrupt and exception dispatch base.

ICCS, NICR, ICR—Programmable clock registers.

TODR—Battery-backed time of day register.

TX/RX DB/CS—Console terminal communication registers.

SVPCTX—In the VAX architecture, the instruction which saves the hardware state of a process such that it can be subsequently resumed on another (or the same) CPU.

MAPEN—A register that indicates if memory management is enabled or disabled.

SID—System ID register which may store a CPU type or a CPU serial number.

PCB—Process Control Block.

LDPCTX—A Load Process Content instruction.

PCBB—The PCB Base address.

ISP, USP, SSP—Interrupt, User, and System Stack Pointers, respectively.

SISR—Software Interrupt Summary Register.

R0..Rn—General purpose registers zero through (n).

V0..Vn—Vector registers zero through (n) (data).

VPSR, VAER—Two specific vector control registers.

PSL—Processor status longword, including condition codes.

The foregoing list of registers is representative, it being realized that additional registers may be defined.

Referring to FIG. 2 there is illustrated a flow chart that broadly depicts the operation of a first method of the invention. At Block A it is detected that the CPU2 18 has failed. At Block B the SPU 12 extracts, via the SCAN/DIAGNOSTIC bus 12a, the internal logical state of the CPU2 18. At Block C the SPU 12 inserts the state, including the identity, of the failed CPU2 18 into the functional CPU1 16. At Block D the functional CPU1 16 continues the user or OS process that was executing on the failed CPU in order to accomplish an orderly removal of the failed CPU from the active set, including the relinquishing of any common resources that were owned by the CPU at the time of failure. Once rescheduled, the process need not be terminated and may be context switched, in a conventional fashion, to some other CPU to continue execution.

That is, this first method operates to continue the operation of a failed data processor with a second data processor so as to achieve an orderly removal of the failed data processor from a set of active data processors.

These method steps are now described in greater detail.

The detection of the failed CPU (Block A) may be achieved by several mechanisms. For example, the OS may cause one or more of the CPUs 14–18 to monitor the progress of the other CPUs in order to detect CPU and software failures. Typically, this is accomplished by setting timers on operations, such as a maximum amount of time that a CPU will wait for a spinlock held by another CPU. If the timer expires it is assumed that the spinlock has not been released because of a failure of the CPU that owns the spinlock.

However, when a scan-based CPU encounters an error, a considerable amount of time may elapse before the error is successfully recovered. This is due to the time required to scan-out the error state and analyze the error (Block B) and to scan-in the recovery state (Block C). During this time, other CPUs in the SMP system 10 may continue to run.

This presents the danger of the OS inappropriately deciding that a CPU, which is undergoing error recovery, has failed. If this occurs, the OS may fail or crash. If the OS does not crash, but instead attempts to proceed, it may encounter a spinlock owned by the CPU in error recovery, or may release all such spinlocks. In the latter case, when the CPU returns from error recovery, it may proceed to operate on the previously spinlocked data structure even though it no longer owns the spinlock.

To prevent the OS from declaring a CPU failure when error recovery is in progress, the invention provides an additional IPR referred to as ERIP (Error Recovery In Progress) 20e. A single copy of this read-only IPR exists in the memory 20 for all CPUs in the SMP configuration. This copy is readable by any of the CPUs. In a simplest embodiment each bit of the ERIP IPR corresponds to one of the CPUs 14–18. These bits are normally clear (reset) to represent that the associated CPU is functional, that is, not undergoing error recovery.

In use, after an implementation specific delay from a time that error recovery starts for a CPU, the corresponding ERIP 20e bit is set. An implementation specific delay after error recovery terminates for a CPU, the ERIP 20e bit corresponding to that CPU is cleared.

Figure 3:
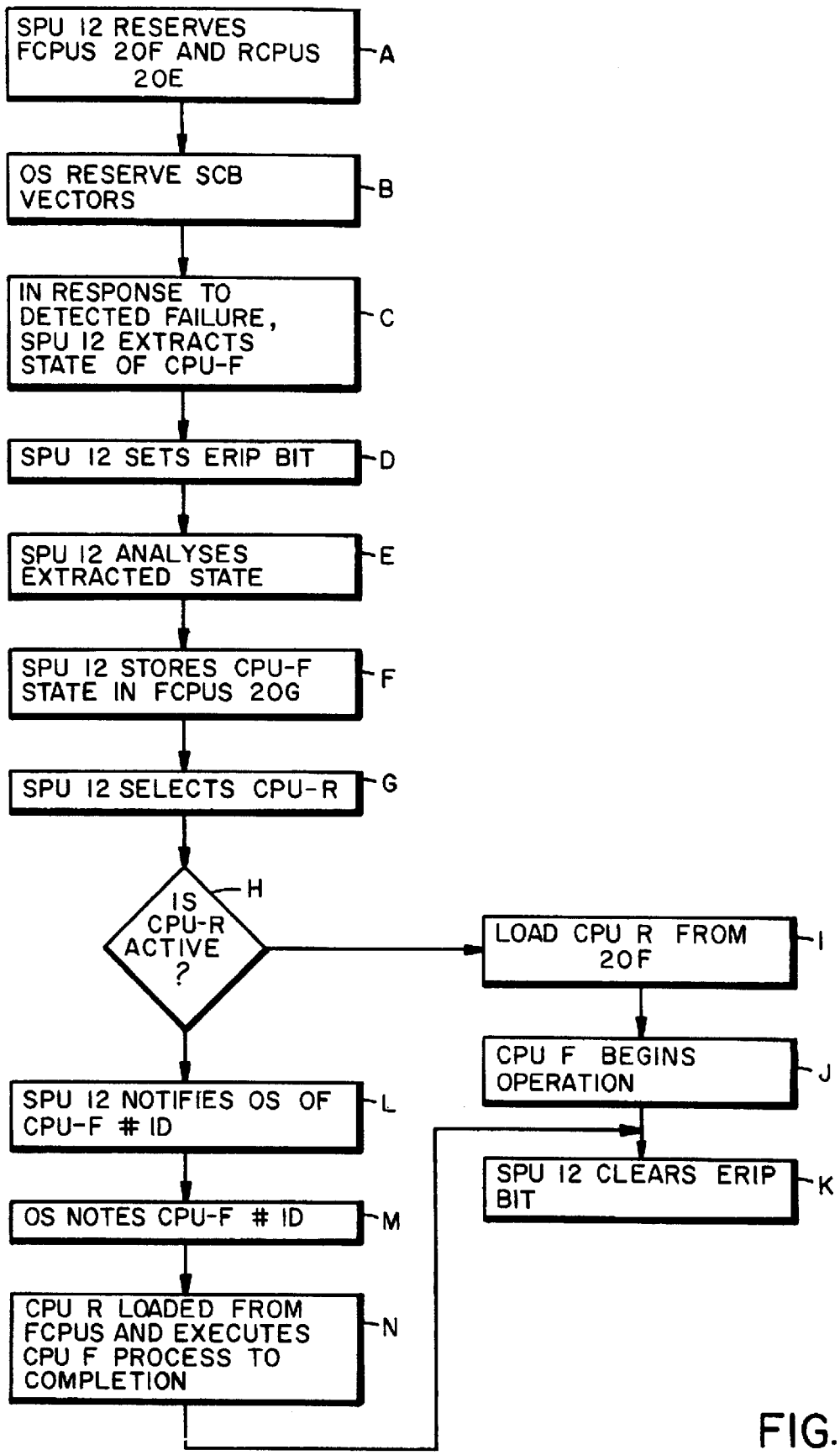
FIG. 3 is a flow chart illustrating in greater detail the method of FIG. 2.

Referring now to the more detailed flowchart of FIG. 3, when the system 10 is initially started the SPU 12 reserves to itself an implementation dependent number of integral pages of physical memory of sufficient size to store the state of two CPUs (Block A). These areas are designated Failed CPU State (FCPUS) 20f and Recovery CPU State (RCPUS) 20g. This reservation of memory may be accomplished by omitting these pages from an "Available Memory" bitmap, although a number of other techniques are available. The memory reservation may also be accomplished with an odd-sized reservation.

Once started, the OS then initializes two SCB vectors (Block B), which are defined below.

During operation of the system 10, and in response to the SPU 12 detecting an unrecoverable CPU failure, the SPU 12 employs the SDB 12a to extract the state of the failed CPU2 18 (Block C), also referred to hereinafter as CPU-F. The ERIP 22e bit corresponding to CPU-F is then set (Block D). The state of ERIP 20e is interpreted by the OS such that the i-stream is continuable, that is, the state of ERIP 20e reflects a fault or trap condition of a current instruction and not an abort. The SPU 12 analyses the extracted state (Block E), and any extracted state that is not specific to CPU-F is restored to system 10. For example, any written data in the associated write-back cache 18a is returned to main memory 20 such that the remaining CPUs can access the data freely.

The state specific to CPU-F is stored in memory 20 within the CPU-F's recovery region 20g, in an implementation dependent format (Block F). For the VAX implementation described herein the stored state includes at least the following information:

the contents of SBR;
the contents of SLR;
the contents of SPTEP;
the contents of SCBB;
the contents of ICCS, NICR, ICR;
the contents of TODR (if CPU-specific);
the contents of TX/RX DB/CS (if CPU-specific);
the contents of MAPEN;
the contents of SID (if CPU-specific);
the PCB contents at the fault (as required by LDPCTX);
the contents of the PCBB;
the contents of ISP;
the contents of SISR;
the contents of the vector registers;
the contents of VPSR, VAER; and
the contents of any IPR which may identify the failing CPU to software. This explicitly includes such "read-only" registers as WHAMI.

Depending on the implementation of the system 10 other specific CPU state information may be stored. The total state saved is collectively referred to as a recovery state, and contains a sufficient amount of information to continue the interrupted process upon another CPU.

The SPU 12 next selects another, functional, CPU to assist in the recovery process (Block G). This CPU is hereinafter referred to as the recovery CPU (CPU-R). CPU-R may be a CPU which is not currently running and is assigned to an inactive set of CPUs. However, for the typical case, CPU-R is one which is already running the OS as a part of an active set of CPUs. The selection mechanism is biased to avoid a BOOT CPU, which typically maintains the time-of-day for the system 10. However, use of the timekeeper CPU is not precluded if no other CPU is available.

One suitable method for selecting the CPU-R is set forth below in Recovery Method 1 (Select Recovery CPU).

The invention operates by one of two general recovery procedures, depending on whether the CPU-R is in the inactive set or the active set (Block H) of CPUs.

If the selected CPU-R is not in the active set (a simple case) the SPU 12 initializes the CPU-R and loads, via the SDB 12a, the recovery state saved in CPU-F's recover region 20g (Block I). This includes the state information that identifies the CPU-F to the software, such as WHAMI and CPUID. The CPU-R thereafter begins operation, in accordance with the loaded recovery state, (Block J) and the SPU 12 clears the ERIP bit corresponding to CPU-F (Block K). No further action is required, as CPU-R has been substituted for CPU-F. In particular, it should be noted that the members of the active set do not change, as CPU-R has assumed the identity of CPU-F.

However, if at Block H it is determined that the CPU-R was in the active set, a different set of actions must be accomplished.

Having already set the corresponding ERIP bit 20e the SPU 12 notifies the OS by initiating a CPU-Failing exception through a reserved SCB vector (Block L). A CPU-Failing exception is similar to a machine check, in that it occurs at a specific IPL, regardless of the current IPL, and also employs the interrupt stack. The implementation of this exception, however, does not cause any instruction to abort.

As indicated in the CPU-Failing exception stack frame illustrated in FIG. 4, one longword parameter is pushed onto the stack; the identification of CPU-F.

In response to the CPU-Failing exception the OS marks CPU-F's per-CPU database such that CPU-F is caused to halt at the first opportunity, in a manner similar to the operation of the VAX/VMS "STOP/CPU=CPU-F/PERMANENT" instruction. The OS also removes the longword parameter from the stack, and executes an REI (Block M).

In accordance with an aspect of the invention, the SPU 12 allows the OS some predetermined number of instructions to perform these operations before the SPU 12 proceeds. It is noted that it is not critical that the OS complete these operations in the allotted time, although it is highly desirable. By example, for a VAX implementation 1000 instructions is a suitable number.

After notifying the OS of the identification of CPU-F, the SPU 12 loads CPU-R with the recovery state stored in CPU-F's recovery region 20f, and the processor (CPU-F) is given an opportunity to come to an orderly halt (Block N). After loading CPU-R control passes to Block K where the SPU 12 clears the ERIP bit for CPU-F, it being remembered that the identity of CPU-F has been temporarily assumed by the functional CPU-R.

In the event that the OS requires that CPU-R's code be running during the rundown of CPU-F's code the invention further provides for the timesharing of CPU-R between the process code that it was already running in CPU-R and the process code that was running at the time of failure in CPU-F.

One method to timeshare the CPU-R is to employ the SCAN/DIAGNOSTIC bus 12a to periodically scan-out the state of CPU-R and place this state into RCPUS 20g. Next, the state stored in CPU-F's recovery region 20f is scanned into the CPU-R and permitted to execute for some period of time. The state is then scanned-out, stored back into CPU-F's recovery region 20f, and the state stored in CPU-R's storage region 20g is once more scanned into CPU-R. This process continues until the orderly shutdown of the failed processor (CPU-F) is achieved. The OS, having marked the identity of CPU-F in response to the CPU-Failing exception, then shuts down CPU-F such that further processes are not scheduled onto the failed CPU.

The timesharing process is preferably controlled by the SPU 12 so that the initiation of timeslicing is not the responsibility of the OS, which may be in a spinlock wait loop.

The SPU 12 first assigns an implementation specific quantum timeslice. Preferably, the timeslice is at least several tens of thousands of instructions long. One consideration of the length of the timeslice is that it is undesirable to expend a significant portion of the SPU 12 functionality with scanning states in and out of the CPU-R.

Thereafter, a suitable timeslicing recovery method is given by the following:

IF .FLAG neql 1 THEN ERROR (CPU-R code halted);
Initiate exception in physical CPU-R, through CPU-R SCB vector Exception parameters=FCPUS,RCPUS PA;
Return CPU-R to IO and CSL interrupt set, if previously member.
Remove_from_active_set (CPU-F);
Clear (ERIP{CPU-F]);
Clear (ERIP{CPU-R]);
{Recovery complete}.

In a further embodiment of the invention the SPU 12 is not required to employ the SDB 12a to extract and insert the two states into CPU-R. Instead, the CPU-R includes microcode for storing its processing state into either FCPUS 20f or RCPUS 20g and for loading the stored processing state from the appropriate one of the reserved memory pages. This microcode-assisted method thus employs the high speed memory bus and associated cache of the CPU-R and operates faster than the relatively slower SDB 12a. The recovery microcode may be executed as a result of an interrupt generated by the SPU 12 at the appropriate timeslice intervals.

The following methods illustrate various aspects of the recovery process, including SPU 12 code, OS code reached through the CPU-Failure exception, OS code for the null process, and OS scheduler code.

```
1 - Select Recovery CPU

CPU_R = none;
DECRU i FROM max_possible_CPU to 0 DO
        IF CPU[i] is operational THEN      !CPU-F obviously is not
            IF CPU [i] is not in active set THEN
                EXITLOOP (CPU_R = –.i)     !Remember idle CPU picked
            ELSE
                IF CPU[i] NEQU Timekeeper (Boot) CPU THEN
                    EXITLOOP (CPU_R = .i)  !Non-timekeeper preferred
                ELSE
                    CPU_R = .i;            !But TK OK if nothing else.
IF .CPU_R EQL none THEN
    Abort_recovery_process;
2

!Service processor code, note that both CPU-F and CPU-R 's bits
!are set in ERIP. PA is physical address bits <33:02>.
Flag = 0
WHILE CPU-R has not halted DO
BEGIN
    Initiate exception in physical CPU_R, thru CPU-RECOVERY SCB vector
    Exception parameters = If .flag eq1 0 then
            low_recovery_memory, high_recovery_memory PA
        else
            high_recovery_memory, low_recovery_memory PA;
    IF .FLAG eq1 0 THEN
    BEGIN
        Remove CPU_R from CPU set which processes interrupts
        Don't send any CSL RXdata or TXdone interrupts to CPU_R
    END
    ELSE
        Undo previous block;
    Flag = .Flag XOR 1;
    Wait (quantum);
END;
3

!OS code reached thru CPU-RECOVERY SCB vector
.ALIGN    LONG       ;Reached via SCB vector at IPL31, as a trap
                     ;or fault, not an abort.
;State to load (PA) is at 0(SP)
;Place to save state (PA) is at 4(SP)
SWAPCTX        ;This could be an MTPR, or a priv'd instr.
4

!OS code, in the null process
NULLPROCESS:
        FIND_CPU_DB R0
10$:  BBS    #cpu$v_shutdown, cpu$1_flags(R0), 20$   ;Branch if shutdown req
      BRB    10$                     ;Continue idle loop
        ;The theory here is that if we are running the null process, we own
        ;no spinlocks. If an OS behaves differently, it must add code to
        ;ensure that no spinlocks are owned before proceeding.
20$:  BBCCI  #cpu$v_shutdown,cpu$1_flags(r0), .+1 ;No need to shutdown
      HALT                           ;Tell service processor we are now idle
5

!OS code, in the scheduler, prior to looking for a process to run
FIND_CPU_DB R0
BBS   #cpu$v_shutdown, cpu$1_flags(R0), run_null_process
```

Further in accordance with the invention the underlying hardware operates to facilitate the temporary assumption of the CPU-F's identity by CPU-R. For example, the mechanism employed to initiate interprocessor interrupts causes an interrupt to occur on whatever physical CPU's WHAMI register matches the interrupt request bit(s). That is, another CPU's request to interrupt CPU-F, while CPU-F is in recovery, interrupts the physical CPU-R, only when CPU-R is running CPU-F's code.

It should be realized that more than one CPU may be in error recovery at any given time.

The error recovery method and apparatus described above is especially effective in dealing with errors that affect the operating system itself, such as code executing on an interrupt stack and code that owns a spinlock. However, most user processes may typically be rescheduled at any time and executed by another CPU. Thus, for some user processes a second error recovery technique packages the process, and the operating system places the process onto the run queue of another CPU. The OS is then notified that a CPU has failed and the failed CPU is removed from the active set. This approach reduces the overall impact on system users as it does not require the service processor to appropriate a recovery CPU.

It should be noted that the second error recovery technique may only be safely applied in certain circumstances. For example, the technique is preferably not applied when the failed CPU is executing on an interrupt stack. As another example, the second technique is preferably not applied when the affected process could not otherwise be rescheduled; that is, when the failed CPU is at or above the Interrupt Priority Level (IPL) used for the scheduler. This second technique should also not be used if the failed CPU owns a spinlock. However, since CPUs own spinlocks, and not processes, the use of IPL in determining whether or not to apply the second technique is generally appropriate. For example, it is generally safe to remove a process running in user mode at IPL 0. For the VAX/VMS embodiment described thus far, the IPL threshold is 3, although for other operating systems another IPL threshold may be appropriate.

In regard to a specific VAX implementation of this second technique, the SPU 12 operates to back-up the failing instruction, and causes a SVPCTX instruction to be executed on behalf of the CPU-F. The address of the affected PCB is passed to the OS, preferably via an interprocessor interrupt to a CPU picked at random. The CPU to which the interprocessor interrupt is directed builds a machine check stack frame and issues a machine check. The error detail may be transmitted via a DMA mechanism, as it is not time critical. CPU-F is left halted, with the appropriate ERIP 20e bit set. This bit being set prevents the remaining CPU(S) from timing-out CPU-F before the interprocessor interrupt is seen. If CPU-F was the only CPU fielding I/O interrupts, another CPU is selected and enabled to take over this function. In any case, the CPU-F no longer receives external interrupts.

A specific example for a two CPU system is now given, and reference is made to the flow chart of FIG. 5. It is assumed that CPU 1 has a user process active in user mode. A string move instruction fails approximately half way through the target string due to an unrecoverable parity error in the CPU 1 data path. At Block A the SPU 12 analyzes the failed instruction and determines that no data is corrupted. This analysis involves determining the nature of the failure. For example, if bad parity for a memory address register is indicated, and if a memory write operation had just taken place, there is a high probability that memory data is corrupted in that the written data was erroneously stored in an unintended memory location. For this type of failure, the system may be halted with an unrecoverable error indication signaled.

However, if a bad parity indication is set for a register that was to be written to, it can be assumed that no data has been corrupted, in that the contents of the failed register would have been overwritten by the continued execution of the instruction. Thus, the second recovery technique may be safely used.

The SPU 12 determines from the internal state of the failed CPU how much of the target string has been processed, and updates the general registers and PSL of the failed CPU as though an interrupt occurred (Block B). At Block C the SPU 12 executes a 'Save Process Context' (SVPCTX instruction in a VAX embodiment). This results in all process state information for the failed CPU being saved in memory (the PCB). By example, the SPU 12 computes a new value for R0 which is saved in (PCBB)+16. R9, although not affected by the string move instruction, may have been modified since the process was scheduled. R9 is thus saved in (PCBB)+52. Other general purpose registers and elements of the process state are similarly saved by the SPU 12. At Block D the SPU 12 passes the address of the PCB to the OS operating on CPU 0. The OS verifies that this PCB matches the current process PCB on the specified CPU. The OS then changes the process state from 'current' to 'computable', and places the process back into the run queue. The OS then marks CPU 1 as not running (Block E). The process is then scheduled for further execution on another CPU in a normal fashion (Block F).

While the invention has been particularly shown and described with respect to preferred embodiments thereof, it will be understood by those skilled in the art that changes in form and details may be made therein without departing from the scope and spirit of the invention.

What is claimed is:

1. A method of operating a symmetric multi-processing data processing system having a plurality of data processing means coupled to an error recovery control means and additionally coupled to a shared memory, said method comprising the steps of:

operating said plurality of data processing means in response to a control program stored in said shared memory;

in response to a failure of one of said data processing means:

detecting, by said error recovery control means, that one of the data processing means has failed during execution of a first process;

extracting, by said error recovery control means, upon detection of said failure, an internal processing state from the failed data processing means, said internal processing state comprising a plurality of register state data, wherein associated with each of said plurality of data processing means is an identifier for indicating an identity of the associated data processing means to processes and external devices, wherein the internal processing state includes an identifier associated with said failed data processing means, and wherein one or more system resources are owned by said failed data processing means, said ownership accomplished by one or more software spinlocks, each of said software spinlocks associated with a respective one of said one or more system resources, said software spinlocks only releasable by a data processing means having an associated identifier equal to the identifier associated with said failed data processing means;

loading by said error recovery control means the extracted internal processing state into a second one of said plurality of data processing means, wherein the step of loading includes the step of copying said identifier associated with said failed data processing means into said second data processing means to allow said second processing means to assume the identity of the failed data processing means in order to release said software spinlocks and in order to handle processor interrupt requests for said failed data processing means;

continuing the execution of said first process associated with said failed data processing means by the second data processing means so as to achieve an orderly removal of the failed data processing means from a set of active data processing means, said continued execution including releasing said one or more spinlocks associated with said ownership of said one or more system resources, thereby releasing ownership of said one or more system resources; and handling, by said second data processing means, processor interrupt requests for said failed data processing means.

2. A method as set forth in claim 1 wherein the step of continuing includes a step of timesharing the second data processing means between the execution of the first process and a second process associated with the second data processing means.

3. A method as set forth in claim 2 wherein the step of extracting by said error control means an internal processing state from the failed data processing means includes a step of storing the extracted processing state in a first portion of said shared memory, and wherein the step of timesharing includes the steps of:

(a) extracting an internal processing state from the second data processing means, the internal processing state being a result of an execution of the second process;

(b) storing the extracted internal processing state from the second data processing means in a second portion of said shared memory;

(c) loading the internal processing state stored in the first portion of said shared memory into the second data processing means, including the step of loading the identifier indicating the identity of said failed data processing means into said second data processing means to change an identity of said second data processing means to be equal to the identity of said failed processing means;

(d) executing, with the second data processing means, at least a portion of the first process that was executing upon the failed data processing means;

(e) extracting the internal processing state from the second data processing means, the internal processing state being a result of the execution of the first process;

(f) storing the internal processing state extracted from the second data processing means back into the first portion of said shared memory;

(g) loading the internal processing state stored in the second portion of said shared memory into the second data processing means, including the step of loading the identifier of said internal processing state into said second data processing means to restore the identity of said second data processing means;

(h) executing with the second data processing means at least a portion of the second process; and (i) repeating steps (a) through (h) until the first process is executed to completion.

4. A method as set forth in claim 3 wherein the steps (a) through (h) are accomplished through the execution of microcode by the second data processing means.

5. A method as set forth in claim 1 wherein the step of detecting includes a step of setting a flag to indicate that the execution of the first process is being continued by the second data processing means.

6. A method as set forth in claim 1 wherein the step of detecting includes a step of notifying said control program controlling said data processing system as to the identifier of the failed data processing means.

7. A method as set forth in claim 6 wherein the control program, in response to a completion of execution of the first process by the second data processing means, permanently assigns the failed data processing means to a set of inactive data processing means.

8. A method as set forth in claim 1 wherein the steps of extracting and loading are accomplished by a service data processor means.

9. A method as set forth in claim 8 wherein the steps of extracting and loading are accomplished by the service data processor means over a serial scan bus.

10. The method of claim 1, wherein said handling of interrupts for said failed data processing means includes matching an interrupt request value with said identifier associated with said failed data processing means.

11. A data processing system comprising:

a plurality of data processing means, each of said data processing means functioning as an active processor and coupled to an error recovery control means;

means for detecting that one of said plurality of data processing means has failed during execution of a first process;

a shared memory, coupled to said plurality of data processing means, for storing an operating system control program for controlling said plurality of data processing means;

means for extracting at time of said failure an internal processing state from the failed data processing means, wherein associated with each of said plurality of data processing means is an identifier for indicating an identity of the associated data processing means to processes and external devices, wherein the internal processing state includes an identifier associated with said failed data processing means, and wherein one or more system resources are owned by said failed data processing means, said ownership accomplished by one or more software spinlocks, each one of said software spinlocks associated with a respective one of said one or more system resources, said software spinlocks only releasable by a processing means having an associated identifier equal to the identifier associated with said failed processing means;

means for loading the extracted internal processing state from the failed data processing means into a second data processing means, wherein the means for loading includes means for copying said identifier associated with said failed data processing means into said second data processing means to allow said second processing means to assume the identity of the failed data processing means in order to release said software spinlocks and in order to handle processor interrupt requests for said failed data processing means;

means for continuing the execution of said first process associated with said failed data processing means by the second data processing means so as to achieve an orderly removal of the failed data processing means from a set of active data processing means;

means for releasing said one or more spinlocks associated with said ownership of said one or more system resources, thereby releasing ownership of said one or more system resources; and means for handling, by said second data processing means, processor interrupt requests for said failed data processing means.

12. A system as set forth in claim 11 and further comprising means for coordinating a timesharing the second data processing means between the execution of the first process and a second process associated with the second data processing means.

13. A system as set forth in claim 12 wherein the means for coordinating is coupled to memory means for setting a flag therein to indicate that the execution of the first process is being continued by the second data processing means.

14. A system as set forth in claim 12 wherein the means for coordinating is coupled to memory stack means for storing the identifier associated with said failed data processing means therein for notifying said operating system control program controlling said plurality of data processing means as to the identifier associated with the failed data processing means so as to prevent further processes from being scheduled for the failed data processing means for execution.

15. A system as set forth in claim 12 wherein the means for extracting and the means for loading are each coupled to a serial scan bus that is further coupled at least to the failed data processing means and to the second data processing means.

16. A method of operating a symmetric multiprocessing system having a plurality of processing means coupled to a shared memory means and an error recovery control means, said method comprising the step of:

operating said plurality of processing means in response to an operating system control program stored in said shared memory;

in response to a failure of one of said data processing means:

detecting by said error recovery control means that one of the data processing means has failed during execution of a first process;

extracting by said error recovery control means, upon detection of the failed data processing means, an internal processing state from the failed data processing means, wherein associated with each of said plurality of data processing means is an identifier for indicating an identity of the associated data processing means to processes and external devices, wherein the internal processing state includes an identifier associated with the failed data processing means, and wherein one or more system resources are owned by said failed data processing means, said ownership accomplished by one or more software spinlocks, each of said software spinlocks associated with a respective one of said one or more system resources, said software spinlocks only releasable by a data processing means having an associated identifier equal to the identifier associated with said failed data processing means;

storing by said error recovery control means the extracted internal processing state within a first region of the shared memory means;

inserting by said error recovery control means the extracted internal processing state into a second data processing means including loading of said identifier of said failed data processing means such that the second data processing means assumes an identity of the failed data processing means, wherein the inserting includes copying said identifier associated with said failed data processing means into said second data processing means to allow said second data processing means to assume the identity of the failed data processing means in order to release said software spinlocks and in order to handle processor interrupt requests for said failed data processing means;

continuing the execution of said first process associated with said failed data processing means by the second data processing means so as to achieve an orderly removal of the failed data processing means from a set of active data processing means;

releasing said one or more spinlocks associated with said ownership of said one or more system resources, thereby releasing ownership of said one or more system resources; and handling, by said second data processing means, processor interrupt requests for said failed data processing means.

17. A method as set forth in claim 16 wherein the step of continuing includes a step of timesharing the second data processing means between the execution of the first process and a second process associated with the second data processing means, the step of timesharing including the steps of:

(a) extracting an internal processing state from the second data processing means, the internal processing state being a result of an execution of the second process;

(b) storing the extracted internal processing state form the second data processing means in a second region of the shared memory means;

(c) inserting the internal processing state stored in the first region of the shared memory means into the second data processing means including the step of copying said identifier of said internal processing state to said second data processing means to allow said second data processing means to assume the identity of said failed processing means;

(d) executing, with the second data processing means, at least a portion of the first process that was executing upon the failed data processing means;

(e) extracting the internal processing state from the second data processing means, the internal processing state being a result of the execution of the first process;

(f) storing the internal processing state extracted from the second data processing means back into the first region of the shared memory means;

(g) inserting the internal processing state stored in the second region of the shared memory means into the second data processing means, including the step of restoring the identity of said second processing means;

(h) executing with the second data processing means at least a portion of the second process; and (i) repeating steps (a) through (h) until the first process is executed to completion.

18. A method as set forth in claim 17 wherein the steps (a) through (h) are accomplished through the execution of microcode by the second data processing means.

19. A method as set forth in claim 17 wherein the step of detecting includes the steps of:

setting a flag within the shared memory means to indicate that the execution of the first process is being continued by the second data processing means; and placing the identifier of the failed data processing means upon a stack structure within the shared memory means for providing the identifier to said operating system controlling said multiprocessing system such that the operating system, in response to a completion of execution of the first process by the second data processing means, permanently assigns the failed data processing means to a set of inactive data processing means.

20. A method of operating a symmetric multi-processing data processing system having a plurality of data processing means coupled to an error recovery control means and additionally coupled to a shared memory, said method comprising the steps of:

operating said plurality of data processing means in response to a control program stored in said shared memory;

in response to a failure of one of said data processing means:

detecting, by said error recovery control means, that one of the data processing means has failed during execution of a first task;

determining whether said first task is an operating system task or a user application task;

performing the following steps upon determining that said first task is a user application task:

(a) placing said first task onto a run queue of a second data processing means;

(b) notifying said second data processing means that said data processing means has failed;

(c) removing said failed data processing means from an active set, said active set indicating which of said plurality of data processing means is currently operable for scheduling; performing the following steps upon determining that said first task is an operating system task:

(a) extracting, by said error recovery control means, upon detection of said failure, an internal processing state from the failed data processing means, said internal processing state comprising a plurality of register state data, wherein associated with each of said plurality of data processing means is an identifier for indicating an identity of the associated data processing means to processes and external devices, wherein the internal processing state includes an identifier associated with said failed data processing means, and wherein one or more system resources are owned by said failed data processing means, said ownership accomplished by one or more software spinlocks, each of said software spinlocks associated with a respective one of said one or more system resources, said software spinlocks only releasable by a data processing means having an associated identifier equal to the identifier associated with said failed data processing means;

(b) loading by said error recovery control means the extracted internal processing state into a second one of said plurality of data processing means, wherein the step of loading includes the step of copying said identifier associated with said failed data processing means into said second data processing means to allow said second processing means to assume the identity of the failed data processing means in order to release said software spinlocks and in order to handle processor interrupt requests for said failed data processing means;

(c) continuing the execution of said first process associated with said failed data processing means by the second data processing means so as to achieve an orderly removal of the failed data processing means from a set of active data processing means, said continued execution including releasing said one or more spinlocks associated with said ownership of said one or more system resources, thereby releasing ownership of said one or more system resources; and (d) handling, by said second data processing means, processor interrupt requests for said failed data processing means.

21. The method of claim 20, wherein said step of determining whether said first task is an operating system task or a user application task determines that said first task is an operating system task if said failed data processing means is executing on an interrupt stack at the time the failure occurs.

22. The method of claim 20, wherein said step of determining whether said first task is an operating system task or a user application task determines that said first task is an operating system task if said failed data processing means is operating at or above a scheduler interrupt priority level at the time the failure occurs.

23. The method of claim 20, wherein said step of determining whether said first task is an operating system task or a user application task determines that said first task is an operating system task if said failed data processing means owns one or more spinlocks.

* * * * *